United States Patent

[11] 3,524,435

[72] Inventor James C. Hambric
Los Angeles, California
[21] Appl. No. 738,557
[22] Filed June 20, 1968
[45] Patented Aug. 18, 1970
[73] Assignee KMF Development Corporation
a Corp. of California

[54] VARIABLE COMPRESSION RATIO INTERNAL COMBUSTION ENGINE
7 Claims, 2 Drawing Figs.

[52] U.S. Cl. .................................................. 123/8.07,
123/48
[51] Int. Cl. ................................................. F02b 55/14,
F02b 75/04
[50] Field of Search .......................................... 123/8,
8(MC), 12(E), 130, 48, 48(A), 48(A1)

[56] References Cited
UNITED STATES PATENTS
1,754,410 4/1930 Allwill ......................... 123/48(A1)UX
2,758,582 8/1956 Humphreys .................. 123/48(A1)UX
2,883,974 4/1959 Heising ........................ 123/48(A1)UX
3,060,910 10/1962 McCall ........................ 123/13(D)UX Primary Examiner—Carlton R. Croyle
Assistant Examiner—Allan D. Herrmann
Attorney—Nilsson and Robbins ABSTRACT: A variable compression rotary combustion engine is disclosed wherein the effective size of the combustion chamber changes in accordance with control criteria, to establish favorable compression ratios appropriate to current operating conditions. The engine includes a pair of synchronized rotors that are driven by combustion to revolve in intersecting annular passages, combustion occurring in somewhat-separated chambers and expanding into the spaces defined between the lobes of the rotors to provide drive power. The combustion chambers are generally cylindrical, having end walls which receive spark plugs and which are slidably disposed within the cylindrical chambers to vary the effective size of the combustion chamber and thereby accomplish variation in the compression ratio of the engine. As disclosed, the end walls are positioned in the combustion chambers by a fluid servo drive arrangement whereby adjustment is substantially continuously adapted to current operating conditions.

Patented Aug. 18, 1970 3,524,435
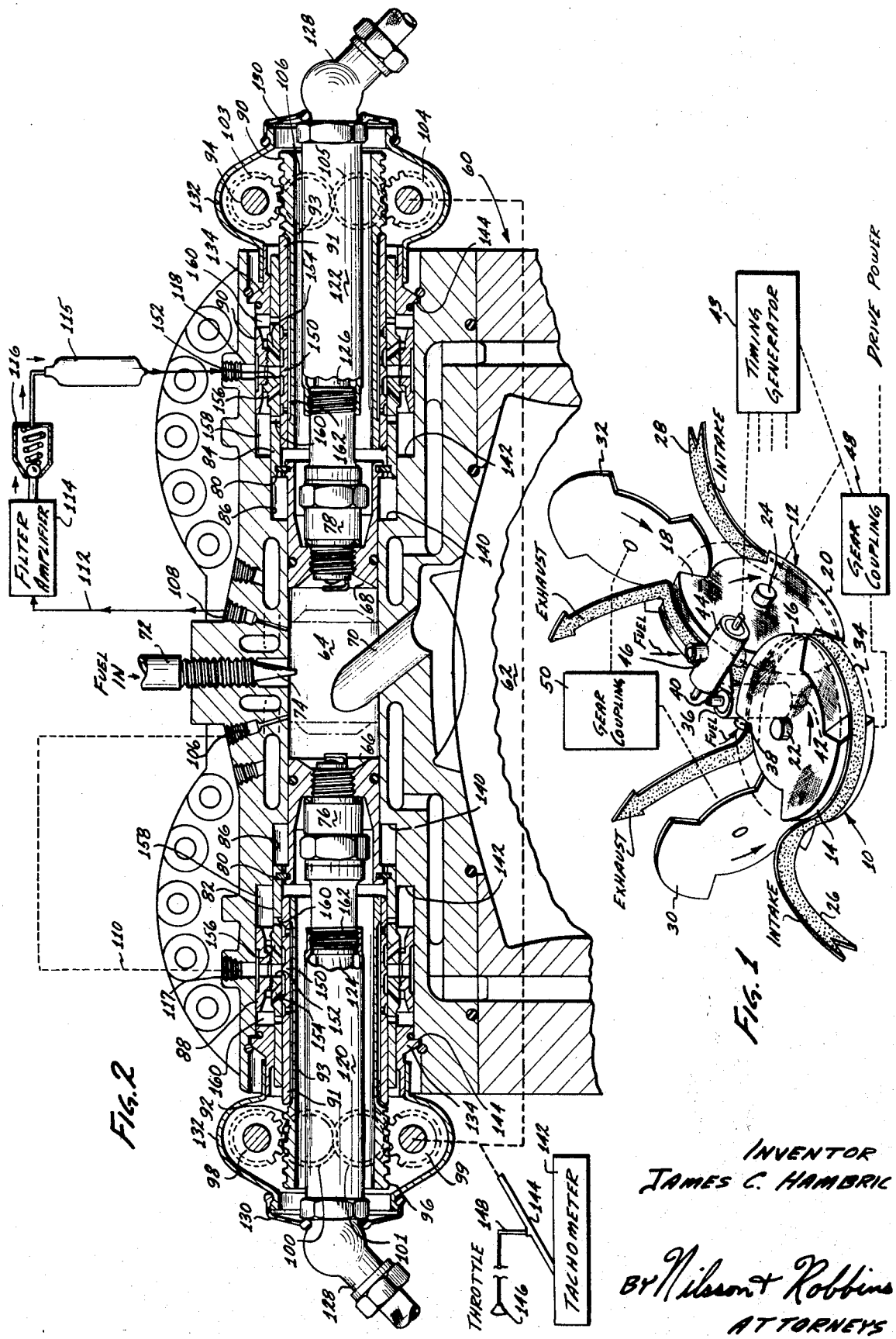

VARIABLE COMPRESSION RATIO INTERNAL COMBUSTION ENGINE

BACKGROUND AND SUMMARY OF THE INVENTION

The internal combustion engine has received a vast engineering effort and popular forms thereof have become somewhat standard in design, with resulting economy. Generally, such engines are of the reciprocating-piston type as commonly employed in automotive, aircraft and marine applications. It has long been recognized that these engines could be improved considerably by providing a variable compression ratio to accommodate different operating conditions. However, reciprocating-piston engines of the past do not readily enable variations in the compression ratio and, in fact, prior efforts to develop a variable-compression ratio reciprocating-piston engine have resulted in the conclusion that such an engine is not economically feasible. However, in view of the ever-increasing need for a relatively clean engine, and one which has the capability of maintaining rated operating power at various altitudes, an increased demand exists for an engine with a variable compression ratio.

In the past, internal combustion engines have been proposed which do not utilize reciprocating pistons. Specifically, for example, one form of such an engine has been previously proposed in which a pair of rotors (carrying radially-extending lobes) revolve in a pair of intersecting annular passages, with the lobes acting as both pistons and cylinder heads. For example, one specific form of such an engine is shown and described in U. S. Patent No. 2,674,982 issued April 13, 1954 to William B. McCall. Another patent covering certain improved features of such an engine issued to the same inventor on October 30, 1962 bearing the number 3,060,910.

In general, the present invention relates to such an engine incorporating a system whereby to accomplish a variation in the compression ratio in accordance with instant operating conditions. The system affords efficient operation and a very high percentage of complete combustion so as to produce substantially clean or fully-burned exhaust gases.

BRIEF DESCRIPTION OF THE DRAWINGS

An embodiment of the present invention is described herein with reference to the appended drawings which also form a part of this specification, and in which:

FIGURE 1 is a perspective and diagrammatic representation illustrative of the operation of an engine constructed in accordance with the principles of the present invention; and FIGURE 2 is a schematic and detailed fragmentary vertical sectional view taken through an engine as diagrammatically represented in FIGURE 1, showing the combustion chambers thereof.

As required, a detailed illustrative embodiment of the invention is disclosed herein. However, it is to be understood that the embodiment merely exemplifies the invention which may be embodied in many forms that are radically different from the illustrative structure. Therefore, specific structural and fundamental details disclosed herein are not to be interpreted as limiting, but merely as a basis for the claims defining the scope of the invention.

Referring initially to FIGURE 1, the somewhat-diagrammatic view is useful to provide an understanding of the philosophy of operation employed in the illustrative embodiment. Specifically, a pair of meshed rotors 10 and 12 are shown mounted for rotation about axes that are in perpendicular relationship. At their outer peripheries, these rotors define lobes which function both as pistons and as cylinder heads in the operation of the unit as an internal combustion engine. That is, specifically, the periphery of the rotor 10 defines radially-extending lobes 14 and 16 while the rotor 12 defines similar lobes 18 and 20. The leading and trailing edges of these lobes are tapered to accommodate a closely intermeshed synchronized motion between the lobes as the rotors 10 and 12 revolve on perpendicular shafts 22 and 24. Thus, when the rotors 10 and 12 are enclosed by a housing (not shown in FIGURE 1) closed chambers or cavities are developed between the rotors, which cavities may be expansively driven by combustion bases to provide drive power as described in considerable detail in the above-referenced patents.

Considering the basic operation of engines of this type in somewhat greater detail, a combustion and exhaust flow path for the rotor 10 is generally indicated by an arrow 26. An arrow 28 affords a similar indication for the rotor 12. It is to be noted that for illustration, these paths (defined by the arrows 26 and 28) are shown to be continuous; however, the gas flow is actually intermittent, in charges carried between the lobes within the enclosing housing (not shown).

During rotation of the rotor 14 (in a counterclockwise direction, as depicted) a charge of air is carried in a cavity 34 (between the ends or faces of the lobes 14 and 16) for compression at a location beyond the meshing intersection of the rotors 10 and 12. The air charged is forced into a generally-cylindrical vertical combustion chamber 36 (of variable length, located at the rear of the engine) which receives fuel as indicated, through an injection port 38. The fuel, atomized in the air charge, is then ignited by a pair of spark plugs 40 and 42 that are affixed in end walls which are telescopically movable in the generally-cylindrical chamber 36. The spark plugs 40 and 42 are connected, for electrical impulses, to a timing generator 43, one well known form of which may comprise simply an automotive-engine distributor.

The expanded gases from the combustion occurring in the chamber 36 move to encounter in sequence: the walls of the enclosing housing (not shown), a side surface of the lobe 20 (on the rotor 12), and a radial end surface of the lobe 16. The force applied to the side surface of the lobe 20 is transverse or axial to the rotor 12 and therefore has substantially no effect but to contain the combustion products for reinforced application to the radial surface of the lobe 16 which is thus yieldably driven. Therefore, as the gaseous products of combustion expand, to drive the rotor 10 as indicated, they are expanded and eventually are dispensed as exhaust from the rotary channel as indicated by the arrow 26. It is to be noted that the rotary valve 30 segregates the spend exhaust products of combustion from the fresh charge of air that is received for another combustion.

The operation of the rotor 12 is similar to that described for the rotor 10, which is somewhat apparent in view of the symmetry of the two rotor structures. Specifically, a charge of air is accepted between the lobes of the rotor 12 for compression to a chamber 44 (a cylinder of variable length) along with atomized fuel which is supplied through a port 46. Combustion of the charge then drives the rotor 12.

In the engine, as disclosed in FIGURE 1, the perpendicular shafts 22 and 24 (upon which the rotors 10 and 12 are carried respectively) are interconnected by a gear coupling 48 from which drive power also is provided. The rotary valve plates 30 and 32 are also coupled to the shaft 22 through a gear coupling 50 (linked to the rotors), all as indicated by conventional dashed lines. The gear couplings 48 and 50 synchronize the motion of the rotors 10 and 12 along with that of the valve plates 30 and 32. In this regard, detailed forms of such systems are shown and described in the above-referenced patents.

In general, the improvements hereof with respect to the prior art, relate to the system of accomplishing variable compression-ratio operation in accordance with instant operating conditions. As indicated above, this variation is accomplished by changing the effective volume of the combustion chambers 36 and 44. Specifically, the end walls of these generally-cylindrical combustion chambers are movable to establish the accommodating volumetric changes. In this regard, the compression ratio may be variously adjusted on the basis of various input parameters including: engine speed, absolute manifold pressure, altitude, throttle position, and so on. Of course, in varying applications and according to varying design criterion, different of these parameters may be employed individually or in combination.

Considering the illustrative engine structure in greater detail, the housing associated with each structure of the rotors 10 and 12 is substantially symmetrical and similar. Therefore, to illustrate the present invention, a sectional view is presented in FIGURE 2 which extends transversely through the combustion chamber 44, showing an exemplary embodiment of the specific structure in full detail.

The structure as shown in FIGURE 2 includes a housing 60 defining the annular cavities 62 in which the rotors 10 and 12 operate and additionally defining the combustion chamber 64 (separately represented as chamber 44 in FIGURE 1). In general, the combustion chamber 64 (FIGURE 2) comprises a cylindrical cavity, the ends of which are closed by pistons 66 and 68, which may be variously disposed within the chamber 64 to vary the volume of the chamber and thereby vary the compression ratio of the engine.

The chamber 64 is connected to the annular cavity 62 through an angularly-offset port 70, through which the charge of compressed air is received, driven by the moving rotor 12. A fuel passage into the combustion chamber 64 is provided through a duct 72 threadably received in the housing 60 and terminating in a fuel-injection nozzle 74. Ignition of the charge within the combustion chamber 64 is accomplished by a pair of spark plugs 76 and 78 threadably received in the opposing pistons 66 and 68. When the fuel charge is ignited, gases which are the product of combustion, pass from the chamber 64, through the port 70 into the cavity 62 to drive the rotor contained therein. The cycle is then repeated and continuous operation results.

Considering the combustion chamber 64 in greater detail, components of the associated symmetrical structure are, in instances, identified by similar reference numerals. The pistons 66 and 68 which are slidably received within the cylindrical chamber 64 are coupled by snap rings 80 to sleeves 82 and 84 respectively which in turn are slidably mounted in bores 86 of enlarged diameter. The sleeves 82 and 84 threadably receive valve annulus members 88 and 90, respectively, over their central, somewhat-enlarged sections. As described in detail below, the central sections of the sleeves 82 and 84 along with the valve members 88 and 90 position the pistons 66 and 68 by pressure-driven spool valve action under control of input signals.

The pistons 66 and 68 along with the sleeves 82 and 84 and spool valve members 88 and 90 are "slaved" or servoed to follow interior cylinder members 91 and 33 which each include concentric mating cylinders 91 and 93 integrally coupled with gear racks 96. The individual end gear racks 96 are meshed with gear wheels 98 and 99 (left) and 103 and 104 (right). These gear wheels are also coupled together in pairs through gear wheels 100 and 101 (right behind the cylinder 91) and 105 and 106 (left) to maintain the gear wheels in meshed relationship.

The gear wheels 99 and 104 are mechanically connected to be driven in accordance with an input signal, as described below, so as to variously position the cylinder structures 91 and 33. In accordance with such placement; the sleeves 82 and 84 are similarly positioned to adjust the spacing between the pistons 66 and 68 and accomplish the desired combustion ratio.

The fluid power for positioning the pistons 66 and 68 is provided under control from the combustion chamber 64. Specifically, a pair of ports 106 and 108 are connected to provide fluid pressure for driving the pistons 66 and 68. The fluid source loops 110 and 112 for providing this pressure are identical; therefore, only the loop 112 is disclosed in detail. The port 108 provides drive pressure to a filter amplifier 114 which in turn pressurizes a small reservoir 114 through a check valve 116. As a result, a substantially constant source of fluid pressure is provided by the loops 110 and 112 to input ports 117 and 118 respectively. Such fluid pressure serves to "slave" the pistons 66 and 68 to the cylinder structures 91 and 33 as considered below.

In the physical arrangement, the cylinder structures 91 and 33 telescopically receive a portion of the spark plugs 76 and 78 respectively as well as cylindrical capacitive shields 120 and 122, through which lead wires 124 and 126 pass to be received through elbows 128 for connection to the timing generator as a source of electrical spark energy. The elbows 128 are received in the housing 60 through seals 130, serving to isolate the interior moving components. In this regard, it is to be noted that the seals 130 dwell on a pair of annular flanged members 132, housing the gear wheels 98 through 105. The housing members are fixed in the stepped bores 86 which provide several annular shoulders. Specifically, the bores 86 define internal shoulders 140 (for limiting inward motion of the pistons 66 and 68), second shoulders 142 (defining an enlarged section of the bores to accommodate the slider valve members 88 and 90), and third shoulders 144 (against which the closures 134 are fitted).

In view of the above structural description of the engine as represented in FIGURE 2, a complete understanding thereof may now be best accomplished by assuming certain conditions and explaining additional structure and operation to accomplish such objectives. Initially, assume the engine is to provide a variable compression ratio in accordance with the degree to which the throttle is open and its instant operating speed. Accordingly, a tachometer 142 of conventional design manifests the speed of the engine by displacing somewhat-resilient cable 144 which is coupled directly to the gear wheels 99 and 104 as indicated. Additionally, the cable 144 is connected to the engine throttle 146 through a leaf-spring lever 148. As a result, the position of the throttle 146 and the indication by the tachometer 142 are integrated as a single mechanical signal in the cable 144 to accordingly displace the gear wheels 99 and 104 which are coupled to the racks 96 and 97 (offering very little resistance to motion). In operation, if the engine speed increases and the throttle is opened, it may be desirable to reduce the size of chamber 64 to accomplish an increase in the compression ratio. To accomplish this change, the gears 99 and 104 are rotated by the cable 144 to drive the gear racks 96 inwardly toward the chamber 64. In this regard, it is to be noted that the cylinder structures 91 and 33 are free to slide with rotation of the gear chains.

When the cylinder structures 91 and 33 move inwardly they move their grooved control sections with relation to the sleeves 82 and 84 respectively. When this sliding displacement occurs, lands 150 (associated individually with the separate symmetrical structures) are displaced inwardly opening ports 152 outwardly. As a result, the flow of pressurized fluid becomes exclusively through ports 154 (isolating the ports 156 from fluid flow). Therefore, pressurizing fluid is not received in spaces 158 while it is received in spaces 160. As a result, the spool valve members 88 and 90 receive an outward pressure differential causing them to move inwardly along with the affixed sleeves 82 and 84 and the pistons 66 and 68. In this manner the pistons 66 and 68 may be moved inwardly to a position indicated in phantom, limited only by abutment with the shoulders 140, and thus varying the compression ratio of engine as desired.

It is to be noted, that during the operation as described above, the spaces 158 are relieved through ports 160 which communicate with grooves 162 that are ported into the annular space between the cylinders 91 and 93. As a result, fluid discharged from the space 158 is released from the engine and may be captured for controlled exhaust or simply permitted to escape to the atmosphere.

In the event that the combined mechanical signal resulting from the position of the throttle 146 and the indication from the tachometer 142, commands a decrease in the compression ratio the sequence of events is exactly opposite to that described above. In such a situation, the space 158 is at a pressure substantially elevated over the pressure in the space 160 with the result that pistons 66 and 68 are displaced outwardly to increase the volume of the combustion chamber 64. In this regard, the limit of outward movement by the pistons 66 and 68 occurs when the spaces 160 are closed.

From the above, it is apparent that the system hereof may be effectively embodied to adapt compression ratios to instant operating altitude, speed, throttle position, and so on, depending upon the particular design and application of the engine. As a result, considerably improved combustion can be obtained with greater efficiency and cleaner exhaust, i.e. few live hydrocarbons. As explained, the system involves the criterion of providing a control signal indicative of the desired combustion ratio, then displacing the end members, e.g. opposing pistons in a cylinder to accommodate the desired combustion ratio by volumetric change. Of course, as indicated above, the system hereof may be readily adapted in a wide variety of different forms and may be incorporated in a wide variety of different machines; therefore, the system as disclosed herein is to be deemed merely an exemplary embodiment.

I claim:

1. An internal combustion engine comprising a housing means defining at least one rotary chamber;

at least one rotor means affixed for rotation in said rotary chamber;

combustion chamber means, defining a substantial cylindrical combustion chamber, for providing combustion gases to drive said rotor means;

means for providing a signal indicative of a desired compression ratio for said engine; and means for varying the operating volume of said combustion chamber in accordance with said signal including at least two piston means slidably disposed in said combustion chamber and means for controlling said piston means in accordance with said signal and including a slider valve.

2. An internal combustion engine according to Claim 1 including two of said rotor means disposed in perpendicular relationship and further including means defining a combustion chamber for each of said rotor means.

3. An internal combustion engine according to Claim 1 wherein said means for controlling said piston means includes a spool valve coupled to said piston means to slidably displace said piston means in accordance with said signal.

4. An internal combustion engine according to Claim 1 wherein said signal is indicative of at least the speed of said engine.

5. An internal combustion engine according to Claim 1 wherein said spool valve is concentric to said cylindrical combustion chamber.

6. An internal combustion engine according to Claim 1 further including means for supplying fluid pressure from said combustion chamber to drive said spool valve.

7. An internal combustion engine according to Claim 1 including two of said piston means and wherein said combustion chamber means further includes a pair of spark plugs fixed in said piston means.